(12) United States Patent
Lewison

(10) Patent No.: US 8,578,792 B2  
(45) Date of Patent: Nov. 12, 2013

(54) DISPLACEMENT SENSOR FORMED ON PLANAR FLEXIBLE BASE

(75) Inventor: John Lewison, Wellingborough (GB)

(73) Assignee: In2Tec Limied (GB)

(*) Notice: Subject to any disclaimer, the term of this patent is extended or adjusted under 35 U.S.C. 154(b) by 1144 days.

(21) Appl. No.: 12/094,386

(22) PCT Filed: Nov. 20, 2006

(86) PCT No.: PCT/GB2006/004329  
§ 371 (c)(1), (2), (4) Date: Dec. 2, 2008

(87) PCT Pub. No.: WO2007/057702  
PCT Pub. Date: May 24, 2007

(65) Prior Publication Data  
US 2012/0279318 A1 Nov. 8, 2012

(30) Foreign Application Priority Data  
Nov. 21, 2005 (GB) .................................. 0523667.4

(51) Int. Cl.  
*G01L 1/22* (2006.01)  
*G01D 7/00* (2006.01)

(52) U.S. Cl.  
USPC .................................................. 73/862.046

(58) Field of Classification Search  
USPC .................................... 73/862.041–862.046  
See application file for complete search history.

(56) References Cited

U.S. PATENT DOCUMENTS

| | | | | |
|---|---|---|---|---|
| 4,121,088 A * | 10/1978 | Doremus et al. | | 219/201 |
| 4,873,399 A * | 10/1989 | Landmeier | | 178/18.03 |
| 5,060,527 A | 10/1991 | Burgess | | |
| 5,080,098 A * | 1/1992 | Willett et al. | | 600/476 |
| 5,372,512 A * | 12/1994 | Wilson et al. | | 439/67 |
| 5,993,400 A * | 11/1999 | Rincoe et al. | | 600/595 |
| 6,094,979 A * | 8/2000 | Haslett | | 73/146.2 |
| 6,543,299 B2 | 4/2003 | Taylor | | |
| 7,299,148 B2 * | 11/2007 | Hunt et al. | | 702/130 |
| 8,253,696 B2 * | 8/2012 | Antaki | | 345/173 |
| 2003/0104263 A1 * | 6/2003 | Molter et al. | | 429/37 |
| 2005/0229713 A1 | 10/2005 | Niblock | | |

FOREIGN PATENT DOCUMENTS

| | | |
|---|---|---|
| EP | 0412987 | 12/1993 |
| EP | 852332 | 8/1998 |
| FR | 2542447 | 9/1984 |
| GB | 1148877 | 4/1969 |
| GB | 2051373 | 1/1981 |
| JP | 09323577 | 12/1997 |

* cited by examiner

*Primary Examiner* — Max Noori  
(74) *Attorney, Agent, or Firm* — Joseph S. Heino; Patrick M. Bergin

(57) ABSTRACT

A displacement sensor (4) for detecting relative displacement of a shaft (1) relative to a housing (3). The sensor (4) comprises four elastomeric pads (6-9) mounted on the flexible strip (5), each elastomeric pad (6-9) having an electrical resistance which varies with force applied to the pad (6-9), and an electrical connector located within the flexible strip (5) for providing electrical connections to the elastomeric pads (6-9). In use, the sensor (4) is positioned so that the region of the strip (5) which carries the pads (6-9) is wrapped around the shaft (1).

7 Claims, 2 Drawing Sheets

DISPLACEMENT SENSOR FORMED ON PLANAR FLEXIBLE BASE

This invention relates to a displacement sensor, that is to say a device for sensing the displacement of one component relative to another. The displacement may, depending on the deployment of the sensor, be a lateral displacement or a rotational displacement.

According to a first aspect of the present invention there is provided a displacement sensor comprising a flexible base; a plurality of elastomeric pads mounted on the flexible support, each elastomeric pad having an electrical resistance which varies with force applied to the pad; and an electrical connector located within the flexible base for providing electrical connections to the elastomeric pads.

The present invention makes use of elastomeric pads that have a measurable electrical resistance which varies with forces applied to the pad. The exact mechanism by which the electrical resistant varies is not critical to the present invention. All that is necessary is that each pad has in some way an electrical resistance which varies with mechanical load.

The pads are mounted on a flexible base which may, for example, be a flexible strip. The flexible base locates the pads and provides electrical connections to each of the pads and accordingly allows the resistance of the pads to be detected at a point remote from the pads.

In use, the displacement sensor is deployed so as to place the part of the displacement sensor containing the pads between two components whose relative displacement is to be sensed. The base may be fixed to one, both or neither of the components to locate the pads between the components. In many applications a portion of the flexible base will extend away from the regions containing the pads to provide a convenient connection to suitable detection and monitoring circuits. The output of the pads is monitored to determine relative movement between the components. When the components move relative to each other one or more of the pads will be compressed thereby changing its electrical resistance and one or more of the pads will elastomerically expand, again altering its electrical resistance. By monitoring the various changes in electrical resistance a qualitative or quantitive measure of the relative displacement of the components can be obtained. The device can be calibrated to provide a vector measure of displacement of one component relative to another, or can be utilised in a manner which indicates only in general terms the magnitude of displacement or indeed only the relative direction of displacement, according to requirements.

According to a second aspect of the invention there is provided an apparatus comprising a first part moveably mounted relative to a second part and a displacement sensor for sensing relative displacement therebetween, the displacement sensor comprising a flexible base, a plurality of elastomeric pads mounted on the flexible base, each elastomeric pad having an electrical resistance which varies with force applied to the pad, and an electrical connector located within the flexible base for providing electrical connections to the elastomeric pads, wherein the elastomeric pads are arranged such that relative displacement between the first and second part causes variations in the forces applied thereon.

Preferably, the first part is pivotally mounted relative to the second part, although it can alternatively be slidably mounted relative thereto.

The invention will be better understood from the following description of a preferred embodiment thereof, given by way of example only, reference being had to the accompanying drawings wherein.

Figure 1:
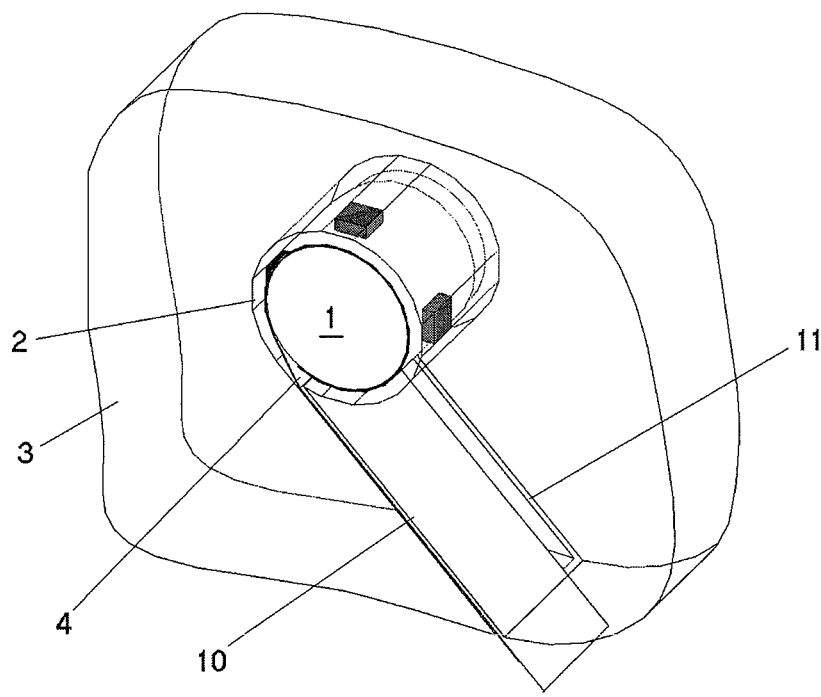
FIG. 1 illustrates an embodiment of the present invention deployed to sense relative movement between a shaft and a housing.

Referring firstly to FIG. 1, there is illustrated schematically a shaft 1 which passes through a clearance hole 2 in a housing 3.

Figure 3:
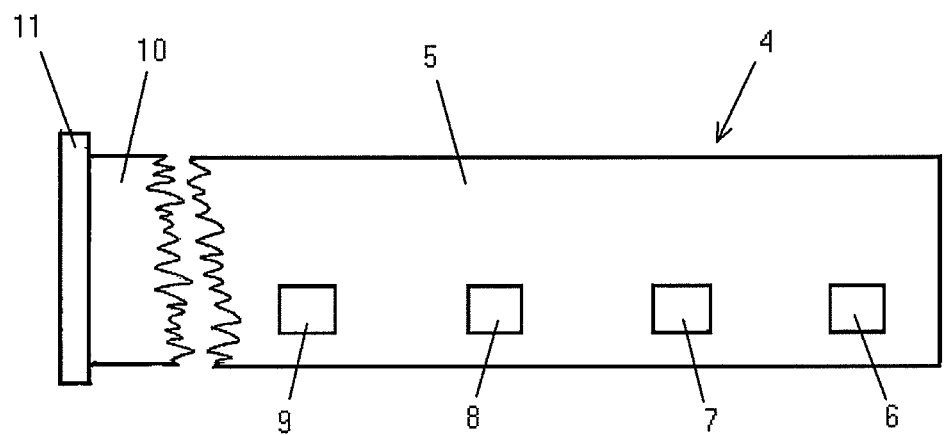
FIG. 3 illustrates schematically the displacement sensor of FIG. 1.

A displacement sensor 4 is positioned to detect relative displacement of the shaft 1 relative to the housing 3. The displacement sensor 4 is illustrated in greater detail in FIG. 3 and comprises a flexible base 5 upon which are mounted four elastomeric pads 6,7,8 and 9. The base 5 is in the form of a flexible strip and includes an elongate region 10 which extends away from the opening 2 through a slot 11 provided for the purpose in the housing 3. The strip 10 terminates in an electrical connector 17 of any convenient type to allow electrical connections to be made to conductors which lie on the surface of or are embedded in the base 5.

Each of the elastomeric pads 6-9 has associated with it electrical connections which are connected to tracks within the base 5. Each of the pads 6-9 has the characteristics that its electrical resistance, as measured across the connectors, varies with applied load. Since the pads 6-9 are elastomeric and will be compressed by an applied load, the electrical resistance of the pads also various with the degree to which the pads 6-9 are compressed.

In use, the sensor 4 is positioned so that the region of the base 5 which carries the pads 6-9 is wrapped around the shaft 1. The opening 2 is sized such that in a rest state each of the pads 6-9 may be slightly compressed between the shaft 1 and the opening 2. In this state each of the pads 6-9 will have a characteristic resistance and these resistances can be measured using instrumentation connected to the connector 11. If, in use, the shaft is translationally displaced laterally relative to the housing 3 the degree of compression of one or more of the pads 6-9 will increase and simultaneously the degree of compression of others of the pads 6-9 will decrease. This will result in a change in the characteristic resistance of the relevant blocks which can be detected by instrumentation connected to the connector 11 to provide an indication of displacement of the shaft. With appropriate calibration, the device can provide a measure of the degree of displacement and, if sufficient pads 6-9 are provided, together with suitable interpretive circuitry, the direction of relative displacement can be detected.

If two of the sensors described above are located to detect displacement of the same component at spaced apart locations, the output of the sensors may be used to detect rotation of the component about an axis external to the sensors themselves.

Figure 2:
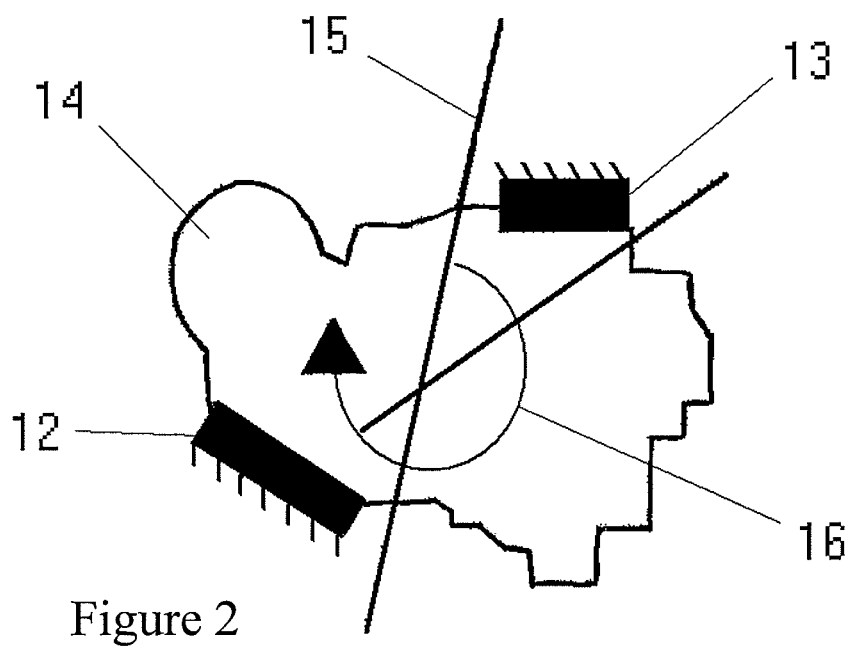
FIG. 2 illustrates schematically an embodiment of the present invention used to detect rotation of an irregularly shaped part.

An alternative embodiment of the invention is illustrated in FIG. 2. In this case two elastomeric blocks 12,13 are secured to appropriate surfaces of an irregularly shaped object 14. The blocks 12,13 are each mounted on a flexible base (which has been omitted from FIG. 2 in the interests of clarity), and are supported on appropriate support surfaces adjacent the object 14. In response to rotation of the object 14 about the axis 15 in the direction of the arrow 16 the load on the block 12 will increase and the load on the block 13 will decrease. This will result in characteristic changes in the resistance of the blocks 12, 13 which can be detected by suitable circuitry to indicate that the object 14 has moved relative to the reaction surfaces upon which the blocks 12,13 are mounted. By appropriate calibration, a quantitive measure of rotation may be obtained.

Figure 4:
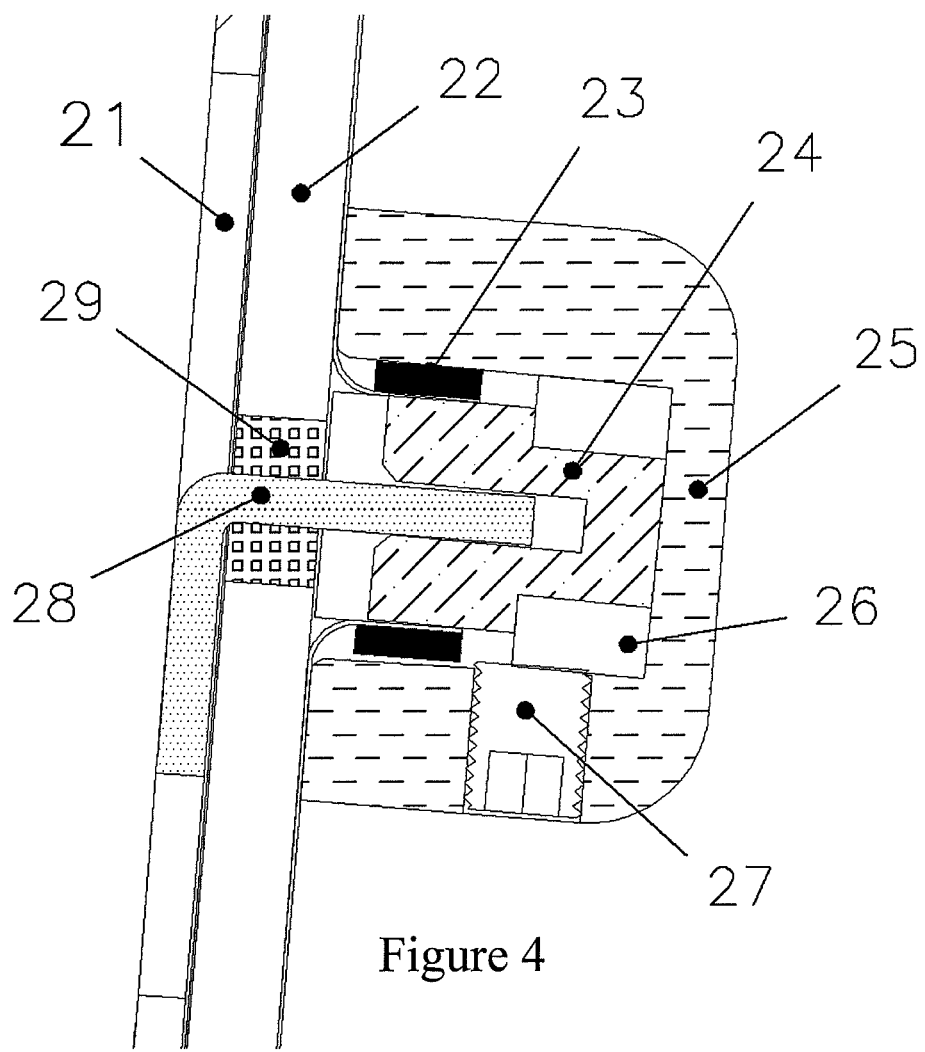
FIG. 4 illustrates an embodiment of the present invention used to detect relative movement between a slider and a housing.

A further alternative embodiment of the invention is illustrated in FIG. 4. In this case, two elastomeric pads 23 are arranged to detect relative displacement of a slider 21 relative to a housing body 22. The slider 21 extends longitudinally, substantially parallel to the housing body 22, and comprises an actuating element 28 which extends substantially perpendicularly therefrom such that it extends longitudinally through an elastomeric seal 29 within the housing body 22. In this way, the slider 21 is moveable along the housing body 22.

A sensor housing 25 is formed on the housing body 22 around a protruding section of the actuating element 28 such that it's longitudinal sides are sandwiched connectingly between the pair of elastomeric pads 23, which are mounted on first and second opposing inner walls of the sensor housing 25 respectively, and a further actuating element 24 mounted on an inner wall of the sensor housing connecting said first and second opposing walls. Additionally, the sensor housing 25 comprises an elastomeric damper 26 sandwiched connectingly between the further actuating element 24 and an adjustment preload screw 27 that is mounted in the first of said opposing walls of the sensor housing 25 such that it is extendable therein by an adjustable amount.

In use, an applied longitudinal force on the slider 21 causes it to move a small distance along the housing body 22. The actuating element 28 transmits the applied force to the further actuator 24, which in turn displaces and compresses one of the elastomeric pads 23 whilst decompressing the other elastomeric pad 23. This compression change results in a proportional resistance change in the elastomeric pads 23.

The adjustment preload screw 27 is operable to apply compression to the elastomeric damper 26, thus allowing for vibration and sensitivity adjustment. In this way the apparatus detects applied force changes in the plane of the slider 21 and the corresponding change in the loop resistance of the circuit in contact with the displacement sensors can be used to output a voltage state to a control system.

It is to be stressed that the exact nature of the elastomeric blocks used in the present invention is not critical to the invention and indeed any form of elastomeric device which has a characteristic resistance may be used.

Whilst elastomeric blocks which have an ohmic resistance which varies with applied force are preferred for use in the present invention, it is to be understood that alternative arrangements are within the scope of the invention. For example, elastomeric blocks which have an AC impedance which varies with force or any other characteristic, for example capacitance, which varies with force may be utilised in displacement sensors in accordance with the present invention.

The invention claimed is:

1. A displacement sensor (4) comprising
a planar flexible base (5);
a plurality of elastomeric pads (6-9;23) mounted on the flexible base (5), each elastomeric pad (6-9;23) having an electrical resistance which varies with force applied to the pad (6-9;23);
an electrical connector located within the flexible base (5) for providing electrical connections to the elastomeric pads (6-9;23); and
an instrument connected to the electrical connector operable to detect a change in the characteristic resistance of the elastomeric pads to provide an indication of displacement between the elastomeric pads.

2. A displacement sensor according to claim 1 wherein the flexible base (5) is a flexible strip (5).

3. A displacement sensor according to claim 1 or 2 that, in use, is deployed so as to place the part of the displacement sensor containing the pads between two components (1,3;21, 22) whose relative displacement is to be sensed.

4. A displacement sensor according to claim 3 wherein the base is fixed to one, both or neither of the components (1,3; 21,22) to locate the pads (6-9;23) between the components (1,3;21,22).

5. A displacement sensor according to any of the previous claims wherein a portion (10) of the flexible base (5) extends away from the regions containing the pads to provide a convenient connection to suitable detection and monitoring circuits.

6. A displacement sensor according to any of the previous claims wherein the elastomeric pads (6-9;23) have an ohmic resistance which varies with applied force.

7. An apparatus comprising
a first part moveably mounted relative to a second part and a displacement sensor according to any of the previous claims for sensing relative displacement therebetween.

* * * * *